Sept. 16, 1958

J. R. SALERNO 2,851,967

VENDING MACHINE FOR DISPENSING FROZEN
CONFECTIONS FROM BULK CONTAINERS

Filed Sept. 1, 1954

INVENTOR.
Joseph R. Salerno

BY Coms, McDougall
Williams & Hersh
Attorneys

United States Patent Office 2,851,967
Patented Sept. 16, 1958

2,851,967

VENDING MACHINE FOR DISPENSING FROZEN CONFECTIONS FROM BULK CONTAINERS

Joseph R. Salerno, Chicago, Ill.

Application September 1, 1954, Serial No. 453,500

3 Claims. (Cl. 107—8)

This invention relates to a vending machine for dispensing ice cream or other frozen confections or materials of similar consistency from bulk containers and it relates more particularly to an improvement in a dispensing machine of the type described in the copending applications of R. G. Tarr, Ser. No. 81,120, filed March 12, 1949, now U. S. Patent No. 2,726,306, dated December 27, 1955, and Ser. No. 112,725, filed August 27, 1949, now U. S. Patent No. 2,716,385, dated August 30, 1955, for preventing extrusion of material inadvertently from elements where it might interfere with the operation or cleanliness of the machine and for preventing deterioration of the material being dispensed thereby to improve the operation of the machine as well as the product that is dispensed from the machine.

As described in the aforementioned copending applications, an ice cream and the like vending machine forming the subject matter of this invention operates automatically to dispense balls of ice cream and the like confections from a bulk container. In a machine of the type described, a container for ice cream and the like frozen confection, such as a 10 or 25 gallon cylinder of ice cream, formed with an opening in the central portion of the bottom wall and which is open at the top wall is inserted with a suitable reinforcing jacket in upright position between a ram that is power operated for displacement endwise through the open end of the cylinder for generating pressure to effect extrusion of the ice cream through the opening at the bottom and the bottom of the cylinder supported on a table that tapers gradually inwardly and downwardly to a central opening in registry with the opening in the bottom wall of the cylinder of ice cream and through which the ice cream extrudes upon the application of pressure by operation of the ram. The ice cream is extruded downwardly through the registered openings into a short tubular member in communication therewith and into a semi-spherical cup or scoop which is dimensioned substantially to block the open end of the tubular member and which is supported on the end of a shaft for rotational movement about a substantially horizontal axis to an inverted position wherein the cup dwells while an arcuate knife rigid with a shaft witin the cup supporting shaft is rocked back and forth over the inner wall of the cup for freeing the ball of ice cream which drops by gravity into a waiting cone or dish therebeneath for delivery to the outside of the machine.

Upon release of the ball of ice cream from the cup, the cup shaft is rotated to return the cup to upright position within the tube and the ram is actuated in the downward direction in the cylinder of ice cream for applying pressure to extrude more ice cream through the tube to fill the cup. When the cup is filled, the continuing pressure from the oce cream causes downward displacement of the cup and concurrent rocking movement of the cup shaft about a laterally disposed axis. Switch means actuated in response to such rocking movement becomes effective to reverse the direction of movement of the ram for a short time to release the pressure on the ice cream in the container. Thus the cup is filled with ice cream for delivery of an ice cream ball or scoop at the start of the next cycle of operation of the machine.

It will be apparent from this brief description that the tubular member through which the ice cream is extruded and which houses the ice cream cup will be formed with vertically disposed slots in alignment with the axis of the cup supporting shaft to enable the vertical displacement of the cup and shaft between its normal or filled position and its retracted or unfilled position. Displacement of the cup downwardly upon filling in response to the continued pressure from the ice cream exposes the upper portion of the slots through which ice cream may extrude. Such portions as are extruded through these openings constitute waste. It interferes with the operation of the machine parts and the build-up of such material as extrudes laterally through the openings becomes unsightly and provides sources for contamination. In addition, when the pressure is released, such openings which remain since the cup filled with ice cream remains in the operated or filled position, expose the ice cream within the tubular member to evaporation and the like with a resulting undesirable change in consistency and taste.

It is an object of this invention to provide means whereby formation of such openings as an incidence to the use of the dispensing machine in normal operation is substantially completely avoided.

More specifically, it is an object of this invention to provide a machine for dispensing ice cream and the like confections from bulk containers with a minimum amount of exposure of the material to the atmosphere to avoid changes in taste and consistency and in which the formation of openings between the scoop or cup and its supports and the tube through which the ice cream or confection is extruded into the cup during normal operation is substantially completely obscured thereby to minimize waste of material and interference with the operation of the machine.

These and other objects and advantages of this invention will hereinafter appear and for purposes of illustration, but not of limitation, embodiments of the invention are shown in the accompanying drawing in which—

Figure 1:
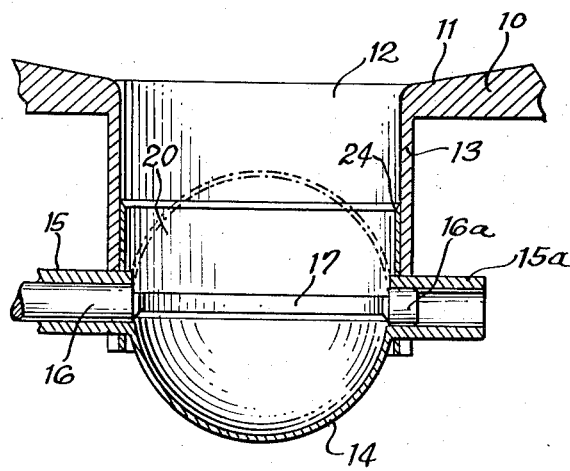
Figure 1 is a sectional elevational view of a fragmentary portion of an ice cream cone vending machine embodying features of this invention.
Figure 2:
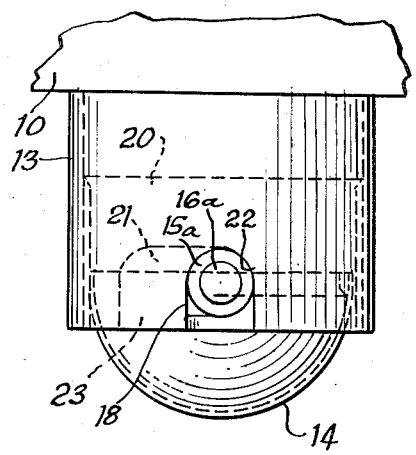
Figure 2 is an elevational view of the portion of the machine shown in Figure 1.

In the drawing, 10 represents a bottom plate or platform upon which the cylinder of ice cream or like confection is supported with the surface 11 upon which the cylinder rests being tapered downwardly to a central opening 12 leading into a tubular section 13 through which the ice cream is extruded.

The ice cream cup or scoop is represented by the numeral 14 and the horizontally disposed hollow shaft rigid with the cup for support thereof and for effecting turning movement from the upright position, illustrated by solid lines in Figure 1, to the inverted position illustrated by the broken lines in Figure 1 is represented by the numeral 15. Within the hollow shaft and rotatable independently thereof is another shaft 16 of smaller dimension which is rigid with the arcuate knife 17 reciprocated by the shaft over the inner wall of the cup 14 for cutting the ball of ice cream from the cup while the latter is in the inverted position. The inner shaft has a stub portion 16ᵃ which seats in the end portion 15ᵃ of the hollow shaft extending beyond the cup for use as a journal in rotating the shafts independently about a common axis.

To enable displacement of the cup vertically in response to the force from the ice cream, the end portion of the tubular member through which the shaft 15 and 15ᵃ extends is formed with a pair of aligned vertically disposed slots 18 extending upwardly from the lower edge to a level for use as a stop for the shaft in positioning the scoop or cup 14 in the retracted or unfilled position. The slots 18 permit displacement of the shafts during movement of the cup from the retracted or unfilled position to its normal or filled position during operation of the machine. In the commercial design, such movement between retracted and normal position may amount to a displacement of about $3/32$ of an inch of the shaft.

To prevent extrusion of ice cream under pressure through the openings left between the shafts and the upper edge of the slot upon displacement of the shaft downwardly through the slot, there is provided, in accordance with the practice of this invention, a separate sleeve member 20 having a length dimensioned to be less than the length of the tubular member 13 and a diameter between the outer walls which enables the sleeve to be telescoped in fitting relation for longitudinal sliding movement within the lower end portion of the tubular member 13. The sleeve is dimensioned between its inner walls to enable rocking movement of the cup 14 therebetween.

In the preferred modification, the sleeve 20 or bushing is formed with a pair of horizontally disposed slots 21 in diametrically opposed sections having a height corresponding to the outer diameter of the shaft 15 with a curvilinear end portion 22 for receiving the shaft 15 in fitting relation. Contiguous with the horizontally disposed slots 21 which are spaced a short distance from the lower edge of the sleeve, are vertically disposed slots 23 which extend upwardly from the lower edge into communication with one end portion of the slot 21 and which are dimensioned to enable the shaft to be displaced therethrough into the horizontally disposed slot 21.

Figure 3:
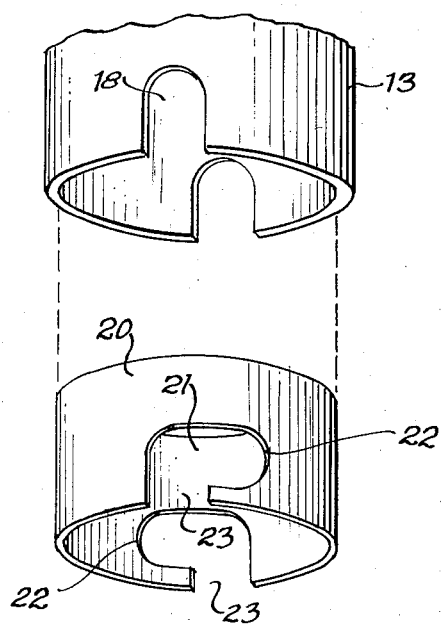
Figure 3 is a perspective view in elevation of some of the elements in Figure 1 in their separated relation for illustrating the dimensional and relative relationships.
Figure 4:
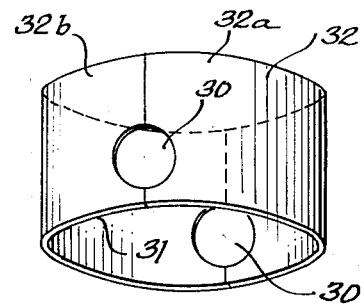
Figure 4 is a perspective view of a modification in the construction of a sleeve member which may be used in the practice of this invention.

In assembly, the sleeve 20 is positioned with the vertically disposed slots 23 aligned with the shaft 15 for displacement of the sleeve endwise relative thereto until the shaft 15 enters the horizontally disposed slots 21. Then the sleeve is rotated about its axis, in the direction to the left shown in Figure 3, to displace the shaft in the far end of the slot out of communication with the vertically disposed slotted portion 23. The assembly is then inserted into the lower end portion of the tubular member with the shaft 15 in communication for passage upwardly through the slots 18 to retracted position. In this position, the shaft 15 is confined within the portion of the sleeve having little free space above or below and the sleeve is shiftable with the cup and shaft relative the tubular member during displacement of the cup between retracted and normal positions whereby the sleeve seals off the ice cream under pressure within the tubular member from the space heretofore available between the shaft and the upper end portion of the slots of the tubular member thereby to prevent access to the ice cream and thereby also to prevent extrusion of ice cream laterally through such openings.

To prevent infiltration of ice cream between the sleeve and the tubular member, the former is dimensioned to provide a close sliding fit with the tubular member and the upper edge 24 of the sleeve is preferably formed with a downward taper from the outer edge for guiding the ice cream into the sleeve.

In the preferred modification, removal of the sleeve for replacement or repair can be effected in a simple and efficient manner merely by rotating the sleeve relative the shaft and cup until the shaft is aligned with the slots 23 so that the sleeve can be lifted off of the shaft and away from the cup.

Instead of such unitary structure, a workable sleeve may be formed with diametrically opposed openings 30 in closely spaced relation with the lower edge 31 of a cylindrical section 32 which is divided into two semi-cylindrical parts 32ᵃ and 32ᵇ along lines which intersect the openings 30 to enable the parts to be fitted together about the shaft 15 to form a sleeve which is held together in the desired relation to form a cylinder upon insertion in fitting relation within the tubular member 13. The walls of the sleeve above and below the shaft thus function to seal off any opening during displacement of the cup and shaft between normal and retracted positions of adjustment. The openings 30 which are formed between the two sections of the sleeve 32 are dimensioned to receive the shaft 15 in closely fitting relation.

It will be apparent from the foregoing that I have provided a simple adapter in the form of a sleeve section for maintaining a desired sealing relation in an extrusion tube which is slotted to permit displacement of a member supported thereon thereby to prevent loss of material inadvertently through the tubular member and further to avoid exposures which might alter the consistency and taste of the material being extruded through the tubular member.

It will be understood that changes may be made in the details of construction, arrangement and operation without departing from the spirit of the invention, especially as defined in the following claims.

I claim:

1. In a machine for automatically dispensing increments of frozen confection from bulk containers, the combination of a housing for support of the bulk container, said housing having a bottom wall with a central opening through which the frozen confection is extruded from the bulk containers, a tubular member depending from the bottom wall of the housing in communication with the opening and having a pair of diametrically opposed, vertical slots extending upwardly from the lower edge of the tubular member, a scoop operatively mounted within the open end of the tubular member and a connecting shaft extending through the slotted portion of the tubular member and connected with the scoop for rotation thereof from upright to an inverted position and back during operation of the machine and for enabling axial displacement of said scoop between normal and retracted positions of adjustment limited by the corresponding rocking movement of the connecting shaft within the slot, and means interposed between the cup and the tubular member for sealing off the openings left in the tubular member upon displacement of the shaft in the slot comprising a cylindrical sleeve dimensioned for a slidable fit against the interior wall of the tubular member and having a pair of diametrically opposed openings dimensioned to correspond to the diameter of the shaft in the portions of the openings aligned with the said slots to enable the shaft to extend in fitting relation therethrough for movement of the sleeve as a part of the scoop and shaft assembly axially relative the tubular member between retracted and normal positions of adjustment.

2. An automatic vending machine as claimed in claim 1 in which the sleeve having a pair of diametrically opposed openings dimensioned to receive the scoop supporting shaft therein in fitting relation is formed of a pair of semi-cylindrical members separable one from the other along lines intersecting said openings.

3. In a machine for automtically dispensing increments of frozen confection from bulk containers, the combination of a housing for support of the bulk container, said housing having a bottom wall with a central opening through which the frozen confection is extruded from the bulk container, a tubular member depending from the bottom wall of the housing in communication with the opening and having a pair of diametrically opposed, aligned vertical slots lying in and extending upwardly from the lower edge of the side walls thereof a scoop operatively mounted within the open end of the tubular member and a shaft extending through the slotted portion of the tubular member and connected with the scoop for rotation thereof from upright to an inverted position and back during operation of the machine and for enabling axial displacement of said scoop between normal and retracted positions of adjustment limited by the corresponding rocking movement of the connecting shaft within the slot, a sleeve having a pair of horizontally disposed diametrically opposed slots dimensioned to have a width corresponding to the diameter of the shaft and a length greater than the diameter of the shaft, and a vertically disposed slot extending upwardly from the lower edge of the sleeve into the opposite edge portions of each of the horizontally disposed slots and dimensioned to enable the shaft to be displaced upwardly therethrough into the horizontally disposed slots for lateral displacement of the shaft into the horizontally disposed slots and out of communication with the vertically disposed slots and in which the sleeve is dimensioned slidably to fit against the interior wall of the tubular member for axial displacement therein as a part of the scoop and shaft assembly.

References Cited in the file of this patent

UNITED STATES PATENTS

| | | |
|---|---|---|
| 1,289,907 | Proper | Dec. 21, 1918 |
| 1,412,727 | Walsh | Apr. 11, 1922 |
| 2,638,065 | Tarr | May 12, 1953 |